J. H. SCHLOTT.
Caster.

No. 217,161.    Patented July 1, 1879.

Witnesses;
Chas. C. Gill
Wm. M. Reilly

Inventor;
John H. Schlott
By his attys,
Cox & Cox

UNITED STATES PATENT OFFICE.

JOHN H. SCHLOTT, OF FREEPORT, ASSIGNOR TO JOHN S. EMMERT AND LOUIS F. BURRELL, OF CHICAGO, ILLINOIS, ONE-FOURTH TO EACH.

IMPROVEMENT IN CASTERS.

Specification forming part of Letters Patent No. 217,161, dated July 1, 1879; application filed April 12, 1879.

*To all whom it may concern:*

Be it known that I, JOHN H. SCHLOTT, of Freeport, in the county of Stephenson and State of Illinois, have invented a new and useful Improvement in Furniture-Casters, of which the following is a specification, reference being had to the accompanying drawings.

The invention relates to an improvement in casters for furniture; and consists in the method hereinafter described and claimed of securing the two half-balls composing the caster upon the central disk, the object being, first, to strengthen the bearing-surfaces of the said half-balls by providing two axles—an inner and an outer—instead of one, as heretofore; second, to cause the half-balls to revolve together; and, third, to secure the ends of the inner axle in such manner that a smooth surface will be presented to the carpet.

Figure 1:
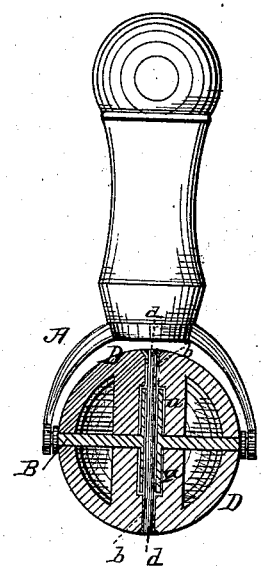
Figure 2:
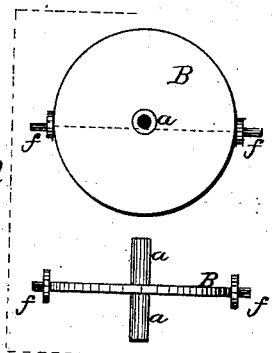

In the accompanying drawings, Figure 1 is a central vertical longitudinal section of the invention. Fig. 2 is a plan and an edge view of the part denominated the "central plate or disk."

In the accompanying drawings, A represents the caster-frame, in the lower ends of which is mounted on pivots the disk B, upon each side of which, at its center, the hollow axles $a$ extend outward at right angles to the horizontal axis of the plate.

The half-balls D each have a central aperture, $b$, the lower or inner portion of which is of sufficient size to snugly receive the hollow axle $a$, while its outer portion is of lesser dimensions, and adapted to receive the pin or inner axle, $d$, which, when the half-balls are in position on each side of the disk B, is passed through the aperture $b$ of each half-ball and through the hollow axles $a$, and has its ends rigidly secured in the outer ends of the apertures $b$ by soldering, whereby a smooth joint is formed, which will not injure the carpet.

It is plain that with the ends of the axle $d$ and half-balls rigidly secured together both will revolve at one time.

The object of employing two axles is to add strength to the device by distributing the pressure of the half-balls over a larger surface than when one axle is used. When but one axle is employed it is liable to twist or break off close to the central disk.

In the present instance the central disk, B, is secured in the caster-frame by means of the pivots $f$, placed about one-eighth or one-quarter of an inch from the true center of the plate, which is thereby caused to assume an upright position, or nearly so, when at rest, and the caster-ball is thrown off the dead-center and permitted to revolve freely in any direction.

When the caster is to be attached to very light articles this change is of but slight advantage, because the roller or ball can be made to move readily; but when the device is employed in connection with heavy pieces of furniture the change is important, for, unless there is some means of throwing the ball off the dead-center, or of insuring its movement in any direction, the article can only be moved with great difficulty.

The weight of the furniture will force the plate B to assume a vertical position when the ball is at rest.

What I claim as my invention, and desire to secure by Letters Patent, is—

1. The caster herein described, consisting of the central plate, B, having hollow axles $a$, the half-balls D, provided with aperture $b$, and the axle $d$, soldered at its outer ends in the aperture $b$, substantially as set forth.

2. In a caster for furniture in which the two half-balls are separated by a central plate, the combination of an inner and an outer axle, one revolving within the other, and the half-balls revolving upon both, substantially as set forth.

3. In a caster for furniture, the plate B, mounted in the caster-frame on pivots which are placed slightly out of the true center of the plate, substantially as and for the purpose set forth.

In testimony that I claim the foregoing improvement in casters, as above described, I have hereunto set my hand this 27th day of January, 1879.

JOHN H. SCHLOTT.

Witnesses:
RUDOLPH MURTINS,
LOUIS KURCH.